I. J. Parker,
Pile Driver.
No. 80,364.      Patented July 28, 1868.

Witnesses,
Wm. A. Morgan,
O. C. Cotton

Inventor
Isaac J. Parker
per Munn & Co.
Atty's

United States Patent Office.

ISAAC J. PARKER, OF BUFFALO GROVE, IOWA.

*Letters Patent No. 80,364, dated July 28, 1868.*

IMPROVED FENCE-POST DRIVER.

*The Schedule referred to in these Letters Patent and making part of the same.*

TO ALL WHOM IT MAY CONCERN:

Be it known that I, ISAAC J. PARKER, of Buffalo Grove, in the county of Buchanan, and State of Iowa, have invented a new and useful Improvement in Machines for Driving Fence-Posts; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
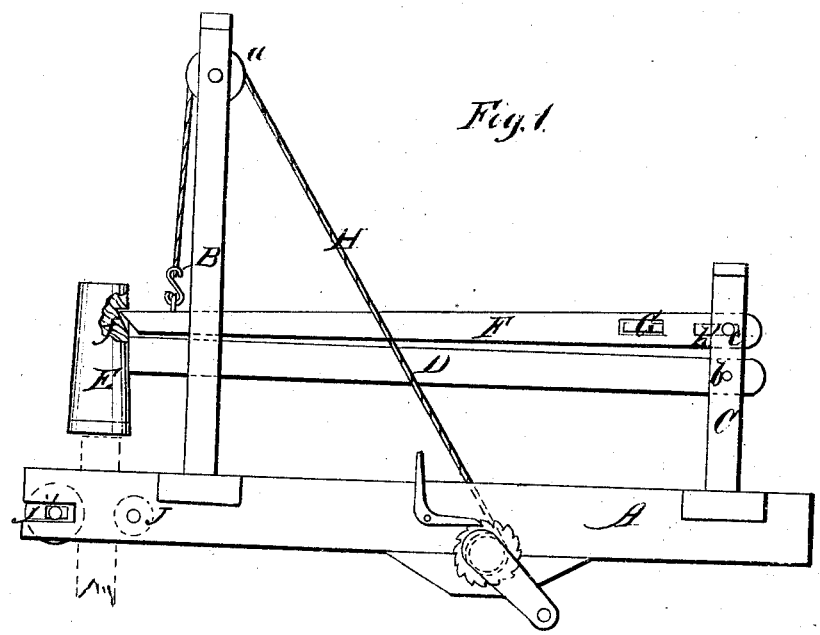
Figure 1 is a side view of my invention.
Figure 2:
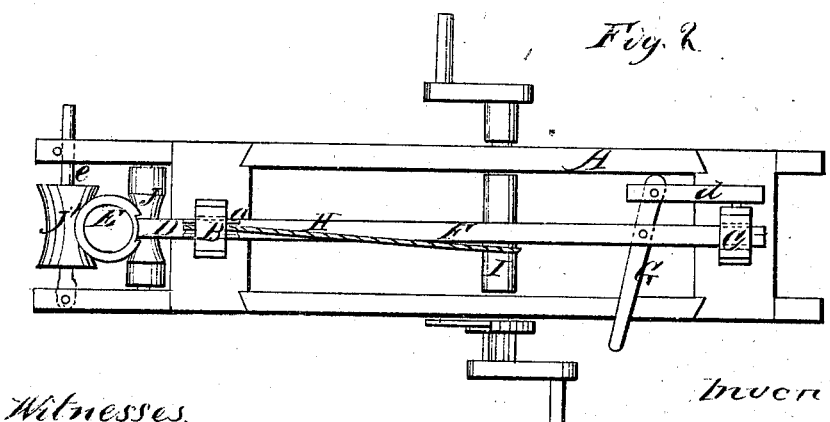
Figure 2 is a plan or top view of the same.

This invention relates to a new and useful machine for driving fence-posts, and is designed to be placed upon a wagon, or any suitable frame mounted on wheels, the device being constructed in such a manner that it may be operated while on the wagon, and drawn from place to place where the posts are to be driven.

In the accompanying sheet of drawings A represents a frame, of rectangular or other suitable form, constructed in such a manner that it will serve as a proper base for the machine, and B is a standard or upright, which is framed into A, and has a pulley, $a$, inserted in it, near its upper part.

C is a shorter standard or upright, framed into the base, near its rear part, and having the rear end of a hammer-shaft, D, secured in it by a pivot or pin, $b$.

E is the hammer, secured on the free or disengaged end of the shaft D.

F is a bar, one end of which is fitted in the upright, C. This bar has an oblong slot, $b'$, made through it for a pin, $c$, on which the bar F works, to pass through, and G is a lever, which passes through a mortise in bar F, and is pivoted to an arm, $d$, on frame A.

This bar F, near its outer end, is connected to a rope, H, which passes over the pulley $a$, and extends down, and is attached to a windlass, I, in the frame A.

In the front part of the frame A there are secured the rollers J J', one of which, J, works in fixed bearings, and the other one, J', having one of its journals, $e$, arranged so that it may be adjusted to increase or diminish the space between the rollers to correspond to the diameter of the stakes to be driven.

These rollers serve to hold the stakes while they are being driven into the ground. The hammer is raised by shoving, through the medium of lever G, the front end of bar F into a notch, $f$, in the hammer, the windlass I being then turned, and the bar F raised, and the hammer with it. When the hammer is fully raised, the bar F is shoved back free from or out of the notch $f$, in the hammer, and the latter falls upon the stake and drives it into the ground, the operation being repeated until the stake is driven the desired distance into the ground. The roller J' is then released at one end, so that it may clear the driven post, and the wagon is moved or drawn along to the place where the next post is to be driven, the post being set in position and secured between the rollers J J', and the hammer operated as before.

This device may be constructed at a small cost, and will effect a great saving in time, in erecting post-and-rail, and post-and-board, and picket-fences.

Having thus described my invention, I claim as new, and desire to secure by Letters Patent—

1. The hammer-shaft D, in combination with the sliding bar F and the windlass I, the former being connected to the latter by a rope, H, passing over a pulley, $a$, and all arranged to operate in the manner substantially as and for the purpose set forth.

2. I further claim the fixed and adjustable rollers J J', in combination with the hammer-shaft D and the bar F, substantially as and for the purpose specified.

The above specification of my invention signed by me, this twenty-first day of May, 1868.

ISAAC J. PARKER.

Witnesses:
MILTON PARKER,
ALBERT TENNEY.